(12) United States Patent
Sztuk et al.

(10) Patent No.: US 11,462,230 B1
(45) Date of Patent: Oct. 4, 2022

(54) SYSTEM FOR FILTERING MECHANICAL COUPLING FROM A MICROPHONE SIGNAL

(71) Applicant: Meta Platforms Technologies, LLC, Menlo Park, CA (US)

(72) Inventors: Sebastian Sztuk, Menlo Park, CA (US); Tony David, San Jose, CA (US); Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/248,797

(22) Filed: Feb. 8, 2021

(51) Int. Cl.
| | |
|---|---|
| H04R 29/00 | (2006.01) |
| G10L 21/0232 | (2013.01) |
| G10L 15/18 | (2013.01) |
| G10L 15/22 | (2006.01) |
| G10L 15/20 | (2006.01) |
| H04R 1/08 | (2006.01) |
| G10L 21/0208 | (2013.01) |

(52) U.S. Cl.
CPC .......... *G10L 21/0232* (2013.01); *G10L 15/18* (2013.01); *G10L 15/20* (2013.01); *G10L 15/22* (2013.01); *H04R 1/08* (2013.01); *H04R 29/004* (2013.01); *G10L 2015/223* (2013.01); *G10L 2021/02082* (2013.01)

(58) Field of Classification Search
CPC ..................................................... H04R 29/00
See application file for complete search history.

(56) References Cited

U.S. PATENT DOCUMENTS

| | | | | |
|---|---|---|---|---|
| 5,917,919 | A * | 6/1999 | Rosenthal ........ | G10K 11/17879 381/71.11 |
| 6,801,247 | B1 * | 10/2004 | Ohishi ............... | H04N 5/23258 348/208.1 |
| 10,433,087 | B2 * | 10/2019 | Bernal Castillo .... | H04R 29/005 |
| 10,841,693 | B1 * | 11/2020 | Ganeshkumar ........ | G10K 11/34 |
| 2006/0155346 | A1 * | 7/2006 | Miller, III ............ | H04R 25/606 607/57 |
| 2019/0320277 | A1 * | 10/2019 | Kelloniemi .............. | H04R 1/02 |
| 2020/0196065 | A1 * | 6/2020 | Pedersen .............. | H04R 19/005 |
| 2021/0185229 | A1 * | 6/2021 | Dick ..................... | H04N 5/2257 |
| 2021/0243523 | A1 * | 8/2021 | Hui ........................ | H04R 3/005 |
| 2021/0392445 | A1 * | 12/2021 | Oosugi ............ | G10K 11/17837 |
| 2021/0397248 | A1 * | 12/2021 | Landemaine ............. | G06T 7/55 |
| 2022/0060812 | A1 * | 2/2022 | Ganeshkumar .. | G10K 11/17875 |
| 2022/0068298 | A1 * | 3/2022 | Wax ........................ | H04R 5/033 |

* cited by examiner

Primary Examiner — Olisa Anwah
(74) Attorney, Agent, or Firm — Lee & Hayes, P.C.

(57) ABSTRACT

An audio system that includes an IMU or accelerometer in physical proximity to a microphone and a driver. The signal generated by the IMU or accelerometer may be used to filter the audio signal generated by the microphone with respect to mechanically coupling between the driver outputting sound and the microphone via a shared structure. In some cases, an accelerometer may be incorporated into a package of the microphone to provide analog-based filtering prior to converting the audio signal of the microphone to a digital format.

20 Claims, 8 Drawing Sheets

FIG. 8

SYSTEM FOR FILTERING MECHANICAL COUPLING FROM A MICROPHONE SIGNAL

BACKGROUND

Today, electronic devices are often designed for use with wearable audio systems. The audio systems are often configured to output sound to a user and to provide noise cancelation and/or audio-based command processing. Often these audio devices are equipped with both speakers or drivers to output the audio to a user and microphones to capture environmental noise for digital noise cancelation and natural language processing. Traditionally, the drivers and the microphones are positioned relative to each other to provide mechanical isolation and, thereby, prevent mechanical coupling between the microphones and the drivers. However, as the overall size and number of components of the audio systems are reduced, it is becoming harder and harder to mechanically isolate the microphones from mechanical vibrations generated by the drivers.

SUMMARY

An electronic system is described herein. The electronic system may comprise a wearable component or device that is configured to provide audio output to a user, detect audio based natural language inputs, and/or provide noise cancellation features. In some cases, the electronic system may comprise one or more microphones that are arranged with respect to a driver such that mechanical coupling between the microphones and driver may occur. For example, the microphones and the driver may be coupled to a shared substrate (such as a shared flex board). In some cases, the system may capture the audio as a continuous stream or for a period of time following a user input via a user interface.

In some implementations, the electronic system, described herein, may be configured to provide mechanical echo cancelation (MEC) for the mechanical coupling between the diver and the microphones in addition to acoustic echo cancellation (AEC) for the acoustic coupling between the driver and the microphones. In some examples, the system may be equipped with one or more inertial measurement unit (IMU), accelerometer, gyroscope, or other device for capturing and/or measuring vibrational data associated with the electronic system, the wearable component, and/or the substrate. The vibrational data generated by the IMU may then be processed with respect to the audio data generated by each microphone to provide the MEC in a manner similar to traditional AEC.

In some cases, an IMU may be positioned relative to each of the microphones. For example, in some cases, the vibrations generated by the driver may propagate through the structure of the wearable component or the substrate, such that vibrations, detected by the microphone differ from the vibrations generated by the driver (e.g., the vibrational data is non-linear) and as such that direct output of the driver is not appropriate to provide MEC. In these cases, the IMU may be positioned within a predetermined distance of each microphone or within a predefined region associated with each microphone. For instance, the predefined region may be selected such that the vibrations detected by a microphone and the IMU may be associated, such as via a predetermined transfer function.

In some implementations, a microphone and the IMU may be provided as part of a single package. For example, a micro electro-mechanical system (MEMS) microphone or device may be provided together with an aligned accelerometer. The package may also include an operational amplifier coupled to receive the output of the microphone and accelerometer such that the operational amplifier may subtract the accelerometer signal from the microphone signal. In this example, the operational amplifier allows the subtractions (e.g., the MEC operations) to be performed on the analog signals of the microphones and accelerometer prior to converting the microphones signal to a digital representation that may be used for natural language processing, voice recording and recognition, phone or interface control, and/or digital noise cancellation. In these implementations, the combination microphone and accelerator package allows the microphones and drivers to be positioned on a substrate or structure without traditional design restraints. In some instances, as an alternative to the accelerometer, an IMU may be associated with or otherwise included on the package.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

As discussed above, many content delivery systems are implementing hands-free controls, such as natural language processing that responds to verbal commands, and/or digital noise cancelation features. These content delivery systems may include an ear-piece, ear-bud, glasses, headset, or other wearable component to provide audio output content directly to the ears of the user. In some cases, the audio output may be sound associated with visual content being concurrently displayed to the user, while in other cases, the audio output content may be standalone content. The wearable components may implement the hands-free control and/or noise cancellation via one or more microphones. However, as the size of the wearable components have been reduced, vibrations generated by the driver or speaker outputting sound to the user is having a greater effect on physically proximate microphones.

As discussed above, traditional systems typically mechanically isolate the drivers and the microphones relative to each other to prevent mechanical coupling related to vibrations caused by the driver or speaker. However, this constraint can limit the minimum size of the wearable component, as well as pose considerable design constraints and costs on the resulting products. As such, the content delivery systems, described herein, are configured to provide audio output to a user, detect audio based natural language inputs, and/or provide noise cancellation features without traditional design and production restraints.

In some implementations, the content delivery systems may comprise one or more microphones that are arranged with respect to a driver such that mechanical coupling between the microphones and driver may occur. For example, the microphones and the driver may be coupled to a shared substrate (such as a shared flex board). The content delivery systems may also be configured to provide MEC for any mechanical coupling between the diver and the microphones in addition to AEC for the acoustic coupling between the driver and the microphones.

In some examples, the content delivery systems may be equipped with one or more IMUS, accelerometers, gyroscopes, and/or other devices for capturing and/or measuring vibrational data associated with the content delivery system. In these examples, the vibrational data generated by the IMU may be processed with respect to the audio data generated by each microphone to deliver the MEC in a manner similar to AEC.

In some cases, the IMU may be positioned relative to each of the microphones. For example, the vibrations generated by the driver may propagate through the structure of the content delivery systems or a shared substrate, such that vibrations detected by the microphone may differ from the vibrations generated by the driver (e.g., the vibrational data is non-linear). Thus, the direct output of the driver is not an appropriate input to a MEC process or component. In this example, the IMU may be positioned within a predetermined distance or acoustic transmission threshold (such as a predetermined distance or predetermined metric based on known acoustic parameters) of each microphone or within a predefined region associated with each microphone. For instance, the predefined region may be defined with respect to a predetermined transfer function with respect to a particular microphone.

In some specific implementations, a microphone and the IMU may be provided as part of a single package. For example, a microphone may be provided together with an accelerometer. The package may also include an operational amplifier coupled to receive the output of the microphone and accelerometer such that the operational amplifier may subtract the accelerometer signal from the microphone signal. In this example, the operational amplifier allows the subtractions to be performed on the analog signals of the microphones and accelerometer prior to converting the microphones signal to a digital representation that may be used for natural language processing and/or digital noise cancellation. By performing the MEC via an operational amplifier or subtraction operation in analog, the content delivery systems and/or the microphone package no longer has to account for a transfer function between the microphone and the accelerometer, thereby reducing the overall complexity of the design and the total processing resources and time required to provide the MEC features.

Figure 1:
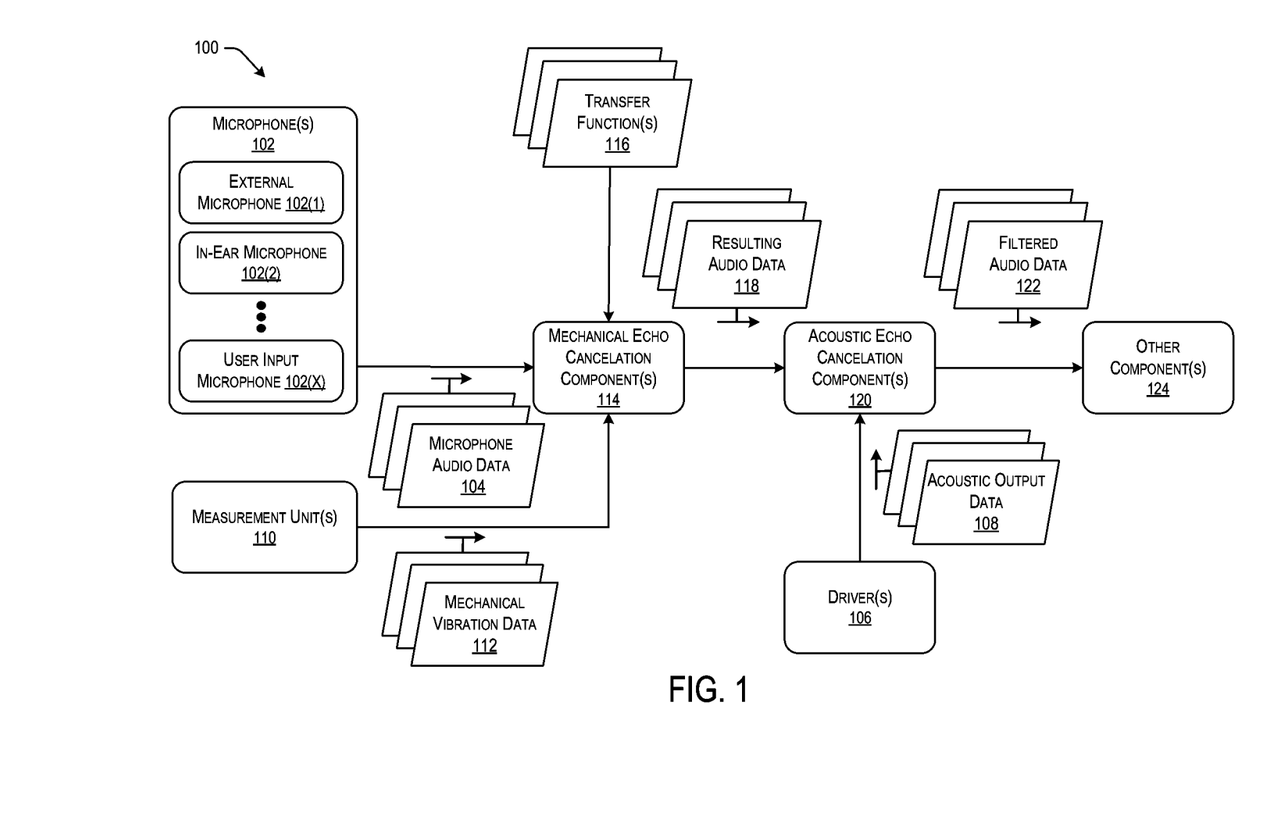
FIG. 1 is a block diagram of an example content delivery system, in accordance with one or more examples.

FIG. 1 is a block diagram of an example content delivery system 100, in accordance with one or more examples. As illustrated the content delivery system 100 may comprise one or more microphones 102 to generate microphone audio data 104 or signals representative of noise within the environment. For instance, the content delivery system 100 may be equipped with an external microphone 102(1) to generate microphone audio data 104 representative of noise in an environment surrounding a user, an in-ear microphone 102(2) to generate microphone audio data 104 representative of noise in the ear canal of the user, user input microphone 102(X) to generate microphone audio data 104 representative of words spoken by the user, and the like. In some cases, each microphone 102 may comprise a microphone array, one or more directional microphones, one or more omnidirectional microphones, and the like. For example, the user input microphone 102 may be a directional microphone associated with a region of a mouth of the user. In this example, it should be understood that the external microphone 120(1) may be positioned outside the ear canal of the user, an outward facing microphone, or a microphone positioned and configured to capture informational noise (such as in illustrated below with respect to FIG. 3).

The content delivery system 100 may also include one or more drivers 106 or speakers (not explicitly pictured) to generate sound representative of acoustic output data 108 for the user. As discussed above, the drivers 106 produce vibrations as the drivers 106 output the sound to the user. The vibrations may couple to or otherwise be detected by the microphones 102 as the vibrations propagate via the structure and/or substrates of the content delivery system 100. As such, the vibrations may be encompassed as background or other unwanted noise in the microphone audio data 104 generated by the microphones 102. While the discussion herein is generally directed to the acoustic output data being provided by the one or more drivers 106 or speakers, other components of the device may provide the acoustic cancelation component(s) 120 with the acoustic output data 108 which may be filtered or otherwise removed using the techniques described herein. For example, the acoustic output data 108 may be provided from an audio controller or audio processor associated with delivering the user content. In other examples, the data provided to the acoustic cancelation component(s) 120 may be inferred from the acoustic output data 108 being sent to the drivers 106.

In the illustrated example, one or more measurement units 110 may be associated with the content delivery system 100 to generate mechanical vibration data 112 associated with the structure and/or substrates of the content delivery system 100. For example, the measurement units 110 may comprise one or more IMUS, accelerometers, gyroscopes, magnetometers, and/or a combination thereof. In some cases, the measurement units 110 may be associated with particular microphones 102. For example, the measurement units 110 may be aligned with or positioned within proximity to particular microphones 102, such that the mechanical vibration data 112 generated by the measurement units 110 is representative of the vibrations detected by the particular microphone 102.

In the current example, a MEC component 114 of the content delivery system 100 may receive the microphone audio data 104 and the mechanical vibration data 112, respectively, generated by the microphones 102 and the measurement units 110. The MEC component 114 may be configured to process the microphone audio data 104 and the mechanical vibration data 112 to remove or filter the mechanical vibration data 112 from the microphone audio data 104. In the illustrated example, the content delivery system 100 may store one or more transfer functions 116 between the various microphones 102 and the various measurement units 110. The transfer functions 116 may be accessible to the mechanical echo cancelation components 114 to assist with the filtering of the microphone audio data 104 based on the mechanical vibration data 112. In some cases, the transfer functions 116 may be determined and stored prior to use of the content delivery system 100 by a user.

In the illustrated example, following the filtering of the mechanical vibration data 112 from the microphone audio data 104, the resulting audio data 118 is provided to an acoustic echo cancelation component 120 to remove audio data introduced via air conduction or as sound output by the drivers 106 and to generate filtered audio data 122. The filtered audio data 122 may then be provided to or received by other components 124 of the content delivery system 100, such as noise cancelation components, natural language processing components, and the like. It should be understood, that while in the current example, the acoustic echo cancellation is performed post the mechanical echo cancelation that in other implementations, the AEC component 120 may perform operations prior to or in parallel with the MEC component 114, such that the acoustic echo cancellation is performed prior to the mechanical echo cancelation.

Figure 2:
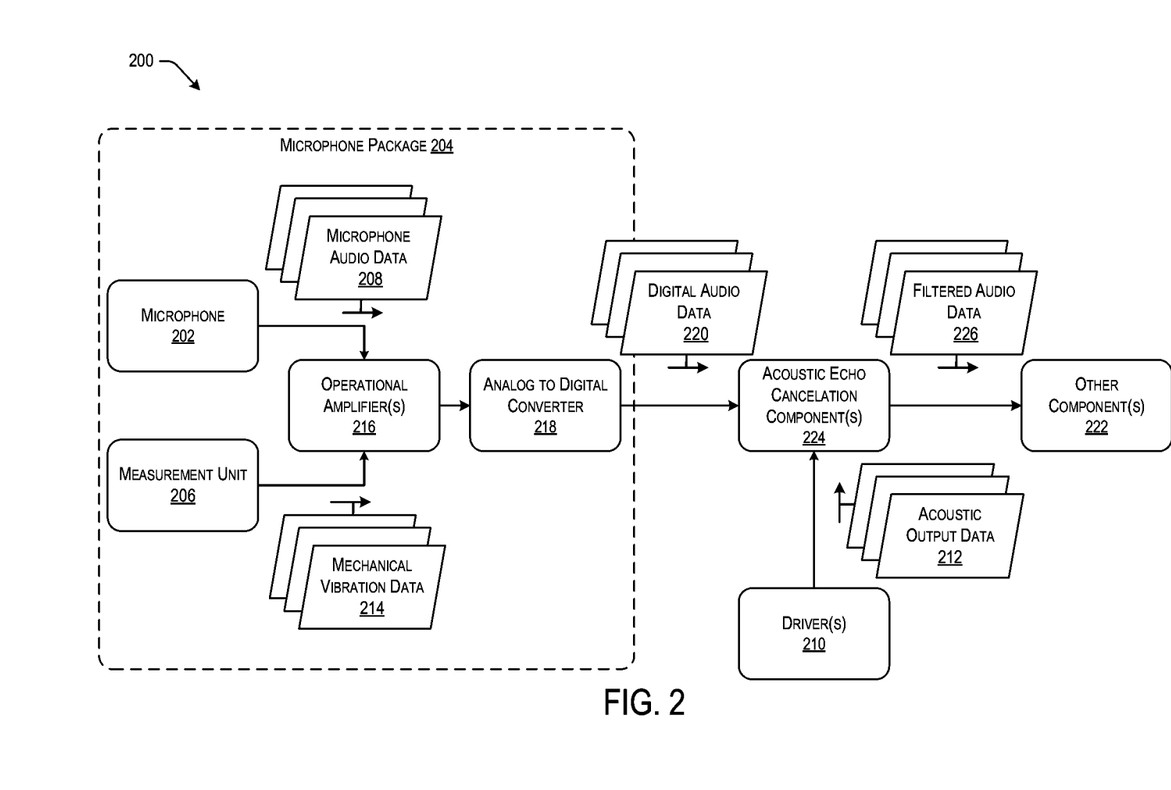
FIG. 2 is block diagram of another example content delivery system, in accordance with one or more examples.

FIG. 2 is block diagram of another example content delivery system 200, in accordance with one or more examples. As discussed above, in some instances, individual microphones 202 may be implemented as a microphone package 204 that is also equipped with a measurement unit 206 (e.g., an accelerometer or other device for detecting vibrations such as a contact microphone, IMU, gyroscope or the like). The microphone package 204 may be manufactured and/or provided independently of a content delivery device, such that the microphone package 204 can be supplied to a variety of content delivery device manufacturers for incorporation into different types of content delivery devices.

In the current example, the microphone 202 may generate microphone audio data 208 associated with noise in the environment surrounding the microphone package 204 and/or the content delivery system 200. The microphone 202 may also incorporate vibrations generated by a driver 210 in physical proximity to the microphone package 204 as the driver vibrates to output sound representative of the acoustic output data 212. The measurement unit 206 may also, concurrently with the microphone 202, generate mechanical vibration data 214 representative of the vibrations from the driver 210 detected by the microphone 202.

Both the microphone audio data 208 generated by the microphone 202 and the mechanical vibration data 214 generated by the measurement unit 206 may be an analog signal that is provided to an operational amplifier 216. The operational amplifier 216 may filter or subtract the mechanical vibration data 214 (e.g., the vibrations as detected by the measurement unit 206 and the microphone 202). By subtracting the mechanical vibration data 214 from the microphone audio data 208, the resulting audio data may better represent the noise in the surrounding environment. Additionally, subtracting the mechanical vibration data 214 from the microphone audio data 208 in the manner discussed with respect to FIG. 2, the system 200 may not be required to store a transfer function between the measurement unit 206 and the microphone 202 (or the measurement units 110 and microphone 102 of FIG. 1).

In the current example, the microphone package 204 may also comprise an analog to digital converter 218 to convert the resulting audio data to digital audio data 220, which may be processed by other components 222 of the content delivery system 200, such as a noise cancelation component and/or a natural language processing component. In some implementations, the digital audio data 220 may be provided to an acoustic echo cancelation component 224 to remove audio data introduced via air conduction or as sound output by the drivers 210 and to generate filtered audio data 122. The filtered audio data 226 may then be provided to or received by other components 222 of the content delivery system 200.

Figure 3:
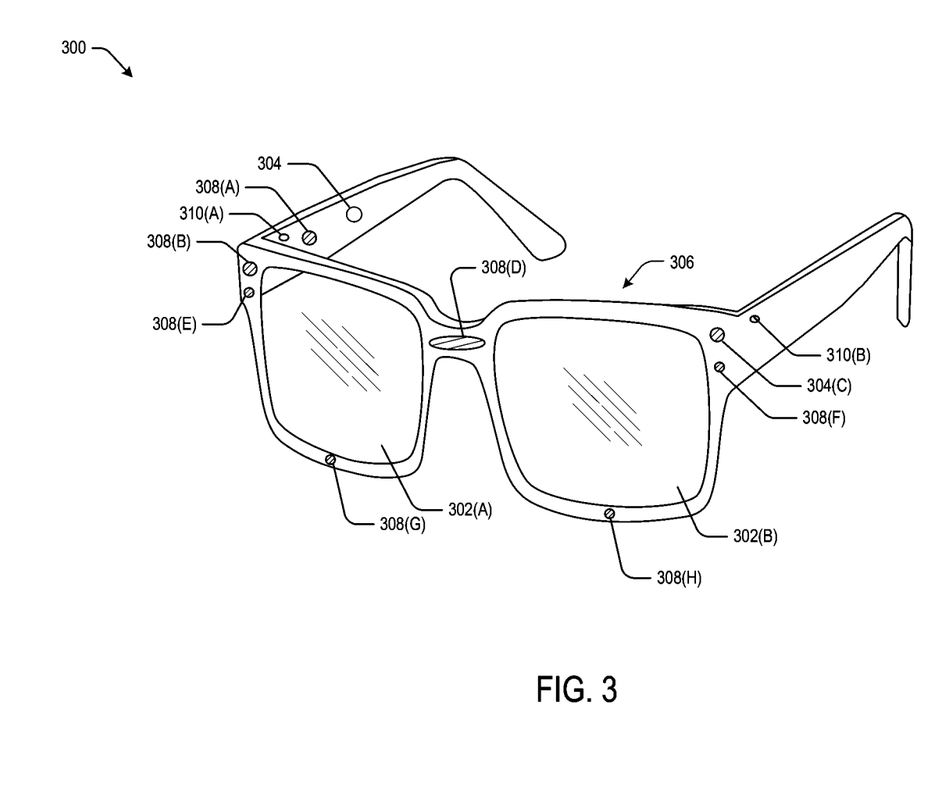
FIG. 3 is a perspective view of an example content delivery system, implemented as wearable system, in accordance with one or more examples.

FIG. 3 is a perspective view of an example content delivery system 300, implemented as wearable system, in accordance with one or more examples. In some examples, the content delivery system 300 is a near eye display (NED) that may be worn on the face of a user such that visual content is presented to the user using display components 302 and corresponding audio content is presented to the user using one or more drivers 304. Examples are also considered in which the content delivery system 300 presents media content to a user in a different manner. Examples of content presented by the content delivery system 300 may include one or more images, video, audio, tactile sensation, or some combination thereof.

In some instances, the content delivery system 300 includes a frame 306, and may include, among other components, a display assembly including one or more display components, such as 302(A) and 302(B), one or more camera assemblies (not shown), and an audio system including one or more audio components, such as the drivers 304 and one or more microphones, such as 308(A)-308(H). In some cases, the microphones 308(A)-308(H) may comprise a microphone array, one or more directional microphones, one or more omnidirectional microphones, one or more microphone packages (such as microphone package 204 of FIG. 2), and the like.

The content delivery system 300 may also include one or more IMUs, such as 310(A) and 310(B), to assist with tracking a pose, orientation, or position of a user as well as to provide the MEC features discussed herein. For instance, the IMUs 310(A) and 310(B) may assist with determining a six-degree of freedom pose of the user and/or the content delivery system 300 during use. In some examples, the IMUs 310 may be configured to provide data or a signal representative of vibrations within a region of the frame 306 for use in filtering audio data generated by the physically proximate microphones 308, as discussed herein.

It should be understood that the frame 306 may hold the other components of the content delivery system 300. In some examples, the frame 306 may include a front portion that holds the one or more display elements, and end pieces (e.g., temples) to attach the content delivery system 300 to a head of the user. In some cases, the front portion of the frame 306 bridges the top of a nose of the user. The length of the end pieces may be adjustable (e.g., adjustable temple length) to fit different users. The end pieces may also include a portion that curls behind the ear of the user (e.g., temple tip, ear-piece, etc.).

Further, while FIG. 1 illustrates the components of the content delivery system 300 in example locations on the components may be elsewhere on the frame 306, on a peripheral device paired with the content delivery system 300, or some combination thereof. Similarly, there may be more or fewer components on the content delivery system 300 than what is shown in FIG. 3.

Figure 4:
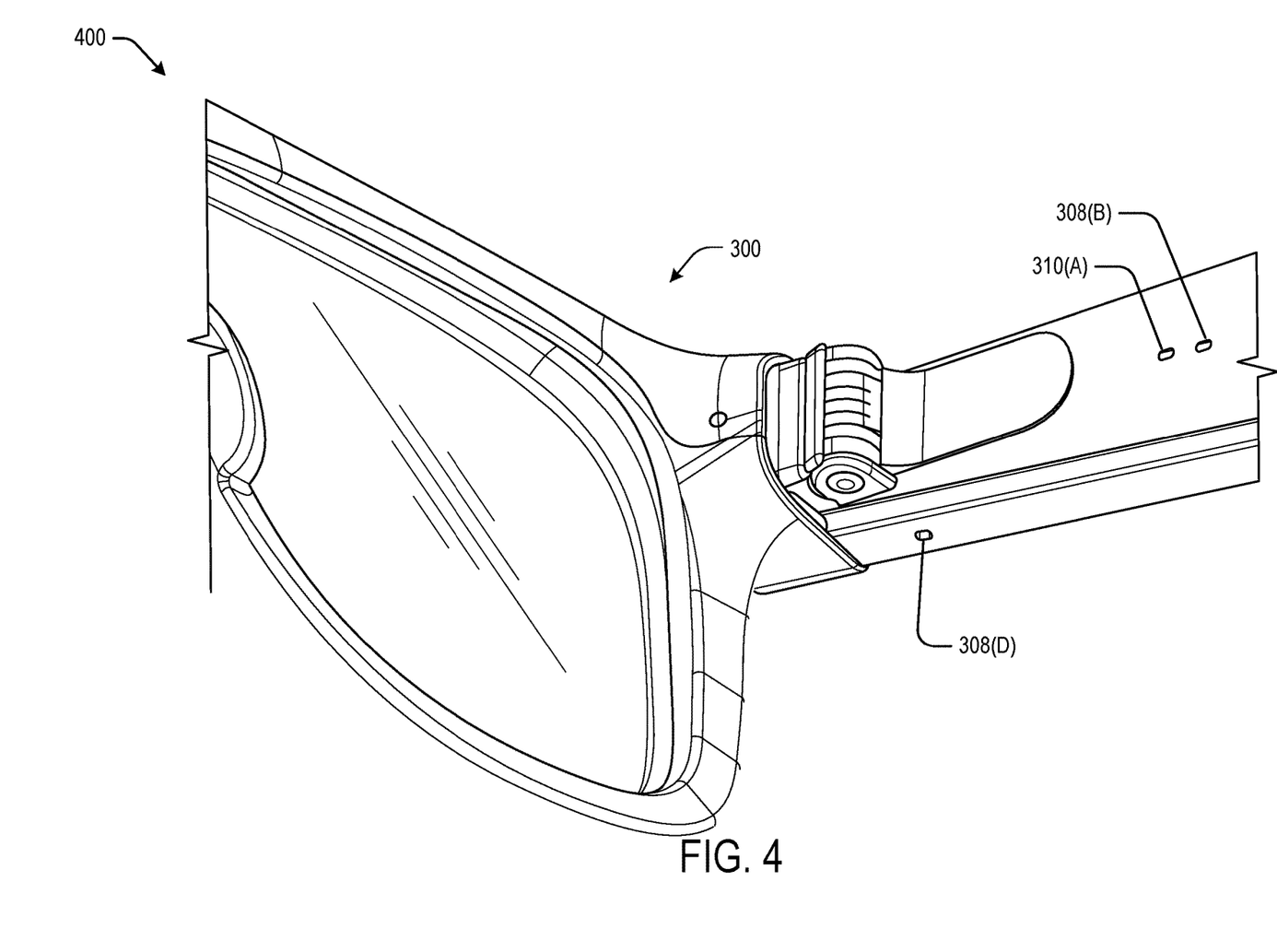
FIG. 4 is another perspective view of a first portion of the content delivery system of FIG. 3, in accordance with one or more examples.
Figure 5:
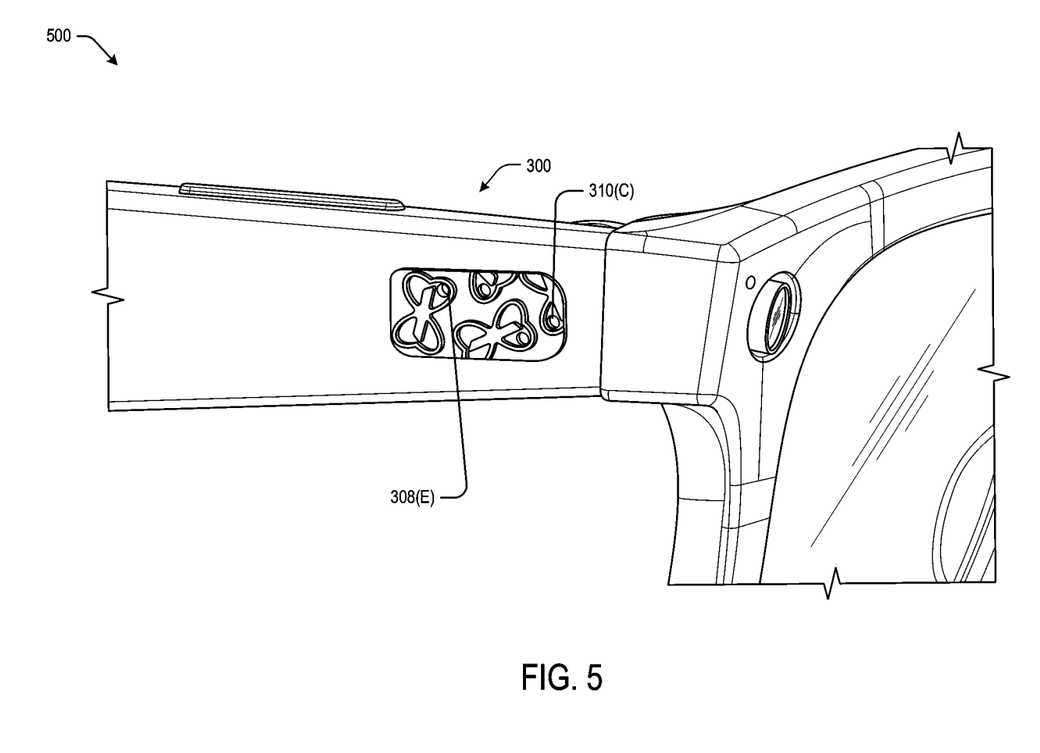
FIG. 5 is another perspective view of a second portion of the content delivery system of FIG. 3, in accordance with one or more examples.

FIGS. 4 and 5 illustrate perspective views of a first portion 400 and second portion 500 of the content delivery system 300 of FIG. 3, in accordance with one or more examples. In the current examples, the first portion 400 shows the interior (e.g., user facing) surface of the content delivery system 300 and the second portion 500 shows the exterior (e.g., environment facing) surface of the content delivery system 300. In the current examples, the microphones 308(B), 308(D), and 308(E) may be used to provide natural language processing and/or noise cancelation with respect to a right ear of the user. Similarly, microphone arrangements may be positioned on the left temple of the content delivery system 300 to provide natural language processing and/or noise cancelation with respect to a left ear of the user. For instance, the microphone 310(B) is positioned similarly as microphone 308(E). It should be understood that in other examples, the microphones 308 may be arranged in differently and the number of microphones may vary.

The first portion 400 and the second portion 500 also illustrates IMUs 310(A) and 310(E) positioned in physical proximity to and/or share a structure, ridged component, or frame with the microphones 308(B), 308(D), and 308(E). The IMUs 310 may be used to assist with determining a pose or position of the content delivery system 300 and/or the user. Additionally, as discussed above the content delivery system 300 may filter, cancel, subtract, or the like the data or signals generated by the IMUs 310 from the data or signals generated by the microphones 308 to provide a MEC feature, thereby improving the quality of the microphone audio data generated by each individual microphone 308.

Figure 6:
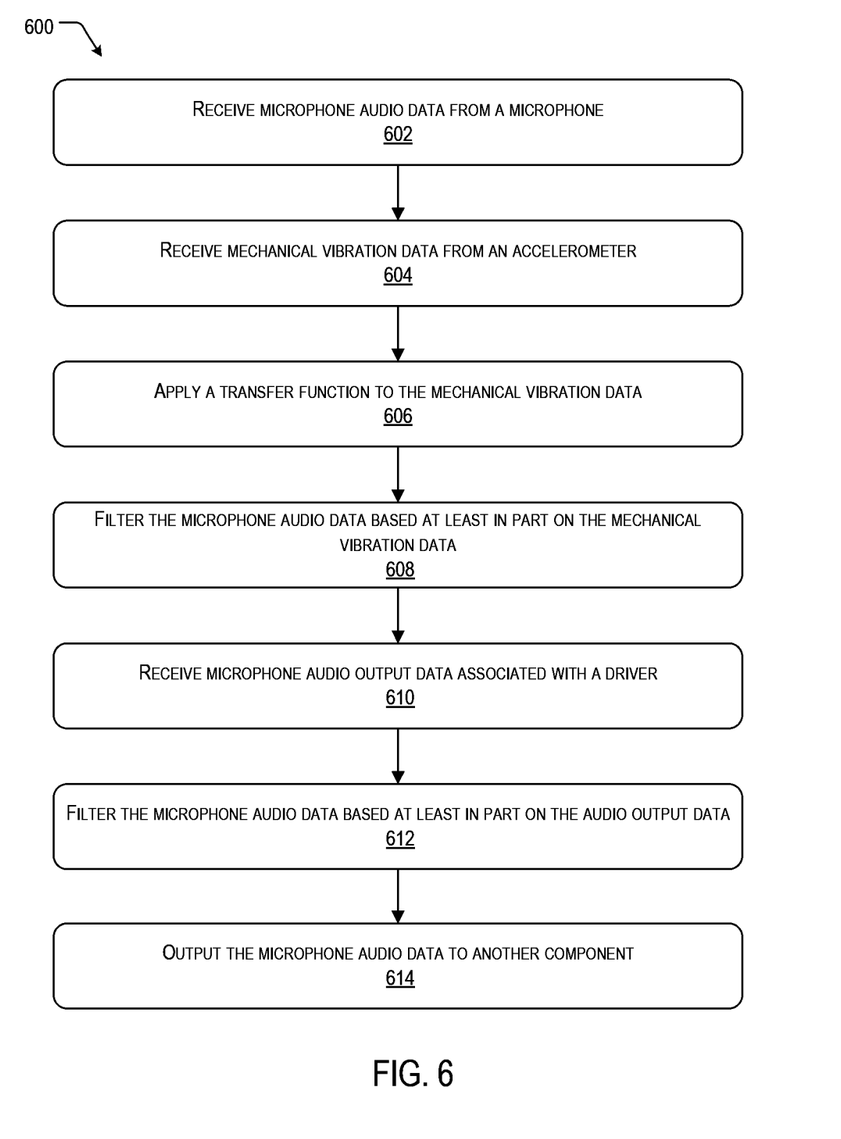
FIG. 6 is a flowchart of an example process for canceling interference due to mechanical coupling between a driver and a microphone from a microphone signal, in accordance with one or more examples.
Figure 7:
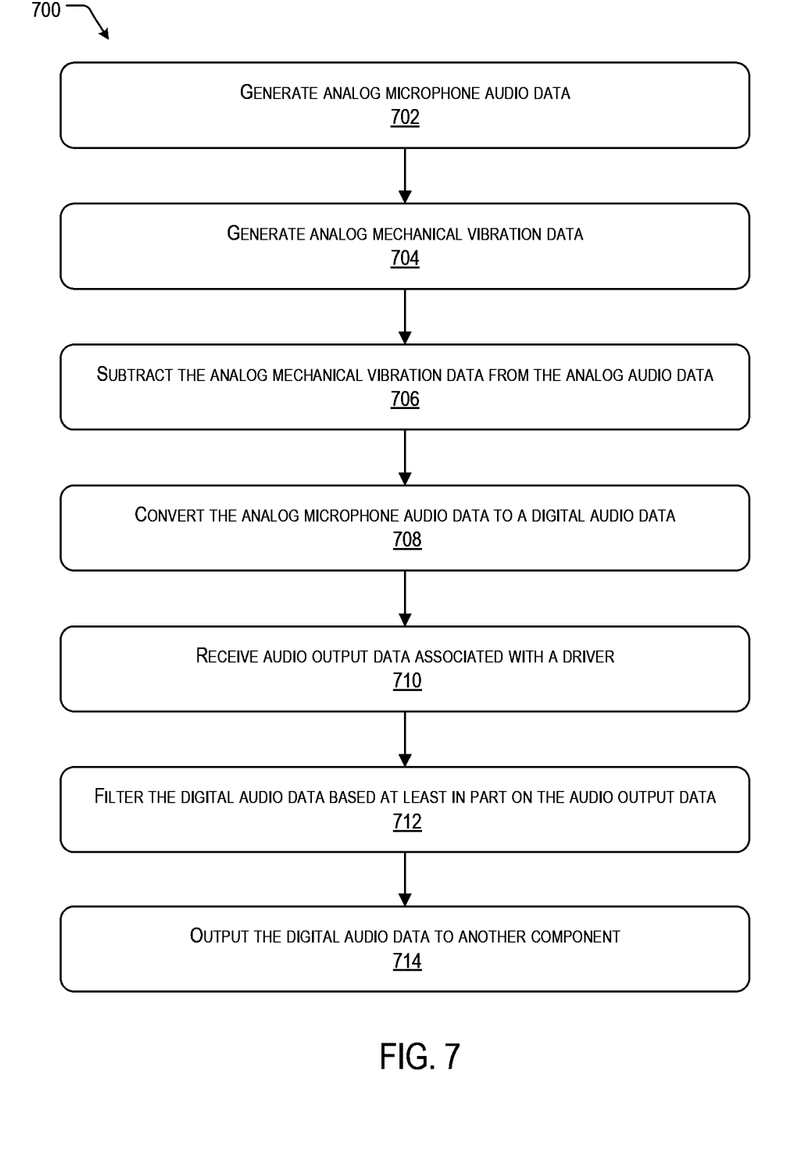
FIG. 7 is a flowchart of another example process for canceling interference due to mechanical coupling between a driver and a microphone from a microphone signal, in accordance with one or more examples.

FIGS. 6 and 7 are flow diagrams illustrating example processes associated with canceling mechanical coupling between a microphone and a diver according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the FIGS. 1-5.

FIG. 6 is a flowchart of an example process 600 for canceling interference due to mechanical coupling between a driver and a microphone from a microphone signal, in accordance with one or more examples. As discussed above, a content delivery system may comprise one or more microphones that are arranged with respect to a driver such that mechanical coupling between the microphones and driver may occur. The content delivery systems may also be configured to provide MEC for any mechanical coupling between the diver and the microphones in addition to AEC for the acoustic coupling between the driver and the microphones.

In some examples, the content delivery systems may be equipped with one or more IMUs, accelerometers, gyroscopes, and/or other devices for capturing and/or measuring vibrational data associated with the content delivery system. In these examples, the vibrational data generated by the IMU and the output audio data output by the driver may be processed with respect to the microphone audio data generated by each microphone to improve the overall quality of the output of each microphone as discussed below.

At 602, a system may receive microphone audio data from a microphone. In this example, the microphone may be positioned or arranged about a structure such that vibrations caused by a driver when outputting sound to a user both mechanically and acoustically couple with the microphone. In this manner, the microphone audio data generated by the microphone may include environmental noise, acoustic noise associated with the output of the driver propagated through the air, and mechanical noise associated with the output of the driver propagated through the structure of the content delivery system.

At 604, the system may receive mechanical vibration data from an accelerometer, IMU, or the like. The accelerometer may be positioned with respect to the structure of the content delivery system, such that the accelerometer is within a threshold distance or acoustic transmission threshold associated with the system of the microphone. In some cases, the accelerometer may be used to determine a pose or position of a user or the content delivery system with respect to an environment (such as a six-degree of freedom pose).

At 606, the system may apply a transfer function to the mechanical vibration data. For example, the transfer function may be representative of a predicted or determined difference in the mechanical vibrations between a position of the microphone and a position of the accelerometer. In some cases, the transfer function may be determined and stored in a memory or computer-readable media accessible to the system. For example, the transfer function may be based at least in part on materials of the system, distance between the microphone and the accelerometer, relative position of the microphone and the accelerometer, acoustic isolation associated with the microphone and/or the accelerometer, and the like. In some cases, the transfer function may be determined via testing and in some cases may be updated in real-time by the system itself.

At 608, the system may filter the microphone audio data based at least in part on the mechanical vibration data. For example, the system may cancel signals of the microphone audio data corresponding to the mechanical vibration data or otherwise subtract the mechanical vibration data from the microphone audio data.

At 610, the system may receive audio output data associated with the driver. For example, the driver may be outputting sound representative of the audio output data into the environment. The microphone may detect and incorporate the sound into the microphone audio data.

At 612, the system may filter the microphone audio data based at least in part on the audio output data. In some cases, the system may desire the microphone audio data to represent noise in the environment, such as to provide noise cancellation or natural language processing. In these cases, the sounds output by the driver may cause issues with noise cancelations (e.g., it is not desirable to cancel the sounds output by the driver) as well as with the natural language processing as additional signals representative of words may be inadvertently introduced into the microphone audio data.

At 614, the system may output the audio data to another component. For example, the system may output the mechanically and acoustically filtered audio data to the noise cancelation system and/or the natural language processing system.

FIG. 7 is a flowchart of another example process for canceling interference due to mechanical coupling between a driver and a microphone from a microphone signal, in accordance with one or more examples. For instance, in some specific implementations, a microphone and an accelerometer (or IMU and the like) may be provided as part of a single package. As discussed above, the package may also include an operational amplifier coupled to the microphone and accelerometer to subtract the accelerometer signal from the microphone signal. In this example, the operational amplifier allows the filtering of the mechanical vibrations associated with the structure of the content delivery system to be performed in analog prior to converting the microphones signal to a digital representation.

At 702, a microphone of the package may generate analog microphone audio data. In this example, the microphone audio data generated by the microphone may represent or include environmental noise, acoustic noise associated with the output of the driver propagated through the air, and mechanical noise associated with the output of the driver propagated through the structure of the content delivery system.

At 704, an accelerometer of the package may generate analog mechanical vibration data. The mechanical vibration data may represent or include the mechanical noise associated with the output of the driver propagated through the structure of the content delivery system.

At 706, an operational amplifier may subtract the analog mechanical vibrations data from the analog microphone audio data and, at 708, an analog to digital convert may convert the resulting audio data into a digital format.

At 710, an AEC component may receive audio output data associated with the driver, and, at 712, the AEC component may filter the digital audio data based at least in part on the audio output data. For example, the AEC may remove any signals associated with the sound output by the driver and detected or captured by the microphone. In some cases, the audio output data may be processed, transformed (such as via an audio to digital converter), or otherwise adjusted prior to receipt at the AEC component.

At 714, the audio data may be output to another component. For example, the system may output the mechanically and acoustically filtered audio data to the noise cancelation system and/or the natural language processing system.

Figure 8:
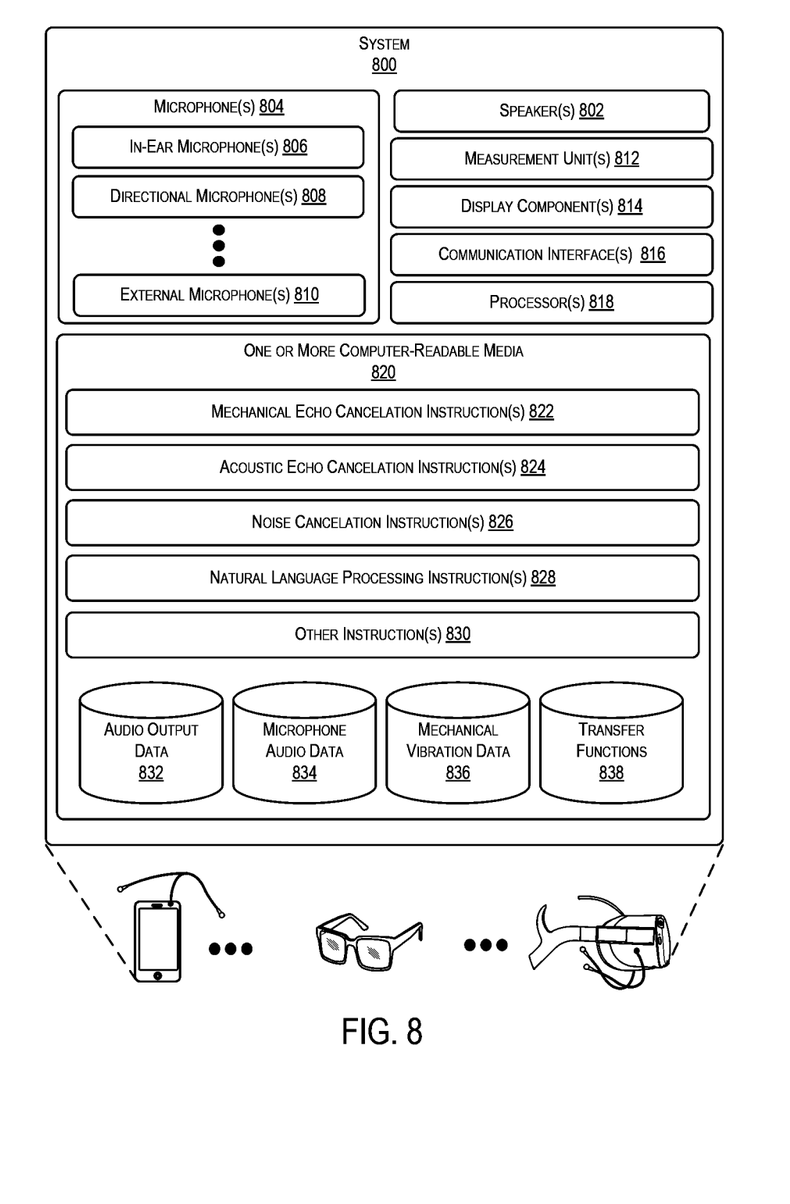
FIG. 8 is an example system implementing mechanical echo cancellation, in accordance with one or more examples.

FIG. 8 is an example system 800 implementing mechanical echo cancellation, in accordance with one or more examples. As discussed above, the system 800 may be configured to provide or deliver visual and/or audio content to a user engaged with a headset device and/or one or more earbuds. In some cases, the system 800 may include a speaker 802 which may incorporate one or more drivers as described herein, where the speaker 802 and/or driver is in proximity to or shares a structure/substrate with one or more microphones 804. In some cases, the vibrations generated by the speaker 802 may mechanically couple to the microphone 804 such that the vibrations are incorporated as unwanted noise into a signal or data generated by the microphone 804, as discussed above.

The microphones 804 may comprise one or more in-ear microphones 806, one or more directional microphones 808, one or more external microphones 810. In some cases, the microphones 804 may comprise a microphone array, a calibrated microphone group, omnidirectional microphones, and/or directional microphones. In general, the microphones 804 may be configured to generate audio data and/or an audio signal representative of noise or sound in an associated environment, such as the environment surrounding a user, an ear canal of a user, and the like. In some instances, the microphones may be configured to detect noise or sound originating from a particular direction or specific relative areas (such as a mount of a user).

The system 800 may also include one or more measurement units 812 or other device for generating vibrational data associated with the system 800. For example, in some cases, the measurement units 812 may comprise one or more IMUS, accelerometers, gyroscopes, magnetometers, or a combination thereof. For instance, in one implementation, the measurement unit 812 may comprise three accelerometers placed orthogonal to each other, three rate gyroscopes placed orthogonal to each other, three magnetometers placed orthogonal to each other, and a barometric pressure sensor to provide mechanical vibration data or signals along three axes.

In some examples, the system 800 may also include display components 814 for providing or presenting visual content to a user. For example, the display components 814 may present two-dimensional visual content or three-dimensional visual content (such as virtual reality content, mixed reality content, or augmented reality content). The display components 814 may be reflective, emissive, or a combination of both. In some examples, the display components 814 may include electrophoretic displays, interferometric modulator displays, cholesteric displays, backlit liquid crystal displays (LCDs), light emitting diode (LED) displays, waveguides, and so forth. In some cases, the display components 814 may also include one or more lens, shutters, and the like to assist with providing a three-dimensional visual experience. In some cases, the display components 814 may comprise two displays, such as illustrated with respect to FIG. 3 above. In these cases, each display may be tailored to provide visual content for a respective eye of the user (e.g., a left eye and right eye).

The system 800 may also include one or more communication interfaces 816 configured to facilitate communication between one or more networks, one or more cloud-based system, and/or one or more physical objects, such as hand-held controller. The communication interfaces 816 may also facilitate communication between one or more wireless access points, a master device, and/or one or more other computing devices as part of an ad-hoc or home network system. The communication interfaces 816 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 816 may be configured to wirelessly and communicatively couple the earbuds to the headset device.

The system 800 may also include one or more processors 818, such as at least one or more access components, control logic circuits, central processing units, or processors, as well as one or more computer-readable media 820 to perform the function associated with the virtual environment. Additionally, each of the processors 818 may itself comprise one or more processors or processing cores.

Depending on the configuration, the computer-readable media 820 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 818.

Several modules such as instruction, data stores, and so forth may be stored within the computer-readable media 820 and configured to execute on the processors 818. For example, as illustrated, the computer-readable media 820 may store mechanical echo cancelation instructions 822, acoustic echo cancelation instructions 824, noise cancelation instructions 826, natural language processing instructions 828, as well as other instructions 830, such as an operating system. The computer-readable media 820 may also store data usable by the various instructions 822-830 and generated by the various components 802-814. The stored data may include audio output data 832 associated with content being output as sound by the speaker 802, microphone audio output data 834 generated by the microphones 804, mechanical vibration data 836 generated by the measurement units 812, and transfer functions 838 between the measurement units 812 and the microphones 804.

The mechanical echo cancelation instructions 822 may be configured to receive the microphone audio data 834 from the microphone 804 and the mechanical vibration data 836 from the measurement unit 812. The mechanical echo cancelation instructions 822 may then filter or subtract the mechanical vibration data 836 from the microphone audio data 834. In some cases, the mechanical echo cancelation instructions 822 may apply one or more transfer functions 838 between the measurement unit 812 and the microphone 804 to the mechanical vibration data 836 prior to filtering or subtracting the mechanical vibration data 836 from the microphone audio data 834.

The acoustic echo cancelation instructions 824 may be configured to receive the audio output data 832 associated with the speaker 802 and the mechanical vibration data 836 from the measurement unit 812. The mechanical echo cancelation instructions 822 may then filter or subtract the mechanical vibration data 836 from the microphone audio data 834. In some cases, the acoustic echo cancelation instructions 824 apply one or more transfer functions 838 between the speaker 802 and the microphone 804 to the to the mechanical vibration data 836 prior to filtering or subtracting the mechanical vibration data 836 from the microphone audio data 834.

The noise cancelation instructions 826 may be configured to provide noise cancellation to environmental noise surrounding the user based at least in part on the filtered microphone audio data 834 received from an in-ear microphone 806 and filtered microphone audio data 834 generated from an external microphone 810.

The natural language processing instructions 828 may be configured to detect and respond to voice commands issued by a user of the system 800 and present in the filtered microphone audio data 834. For example, the natural language processing instructions 828 may receive filtered microphone audio data 834 from a directional microphone 808 associated with a region of a face of the user (such as the region of the mouth of the user).

The foregoing description has been presented for illustration; it is not intended to be exhaustive or to limit the scope of the disclosure to the precise forms disclosed. Persons skilled in the relevant art can appreciate that many modifications and variations are possible considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the steps, operations, or processes described herein may be performed or implemented with one or more hardware or software modules, alone or in combination with other devices. In examples, a software module is implemented with a computer program product comprising a computer-readable medium containing computer program code, which can be executed by a computer processor for performing any or all the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
 a microphone to generate microphone audio data, the microphone associated with a structure;
 a measurement unit to generate mechanical vibration data, the measurement unit associated with the structure and less than or equal to a predetermined distance from the microphone, the predetermined distance based at least in part on a transfer function;
 a first component to subtract the mechanical vibration data from the microphone audio data; and a digital to analog converter to convert the microphone audio data into digital microphone audio data and send the digital microphone audio data to an acoustic cancelation component.

2. The system of claim 1, wherein the microphone and the measurement unit are associated with a shared package.

3. The system of claim 1, wherein the measurement unit is at least one of:
an inertial measurement unit (IMU);
a contact microphone;
an accelerometer; or
a gyroscope.

4. The system of claim 1, further comprising a driver associated with the structure, the driver to output sound into an environment based on acoustic output data, and wherein the mechanical vibration data represents data associated with mechanical coupling between the driver and the microphone.

5. The system of claim 1, wherein the acoustic echo cancelation component is configured to filter the digital microphone audio data based at least in part on the acoustic output data.

6. The system of claim 4, wherein the driver, the microphone, and the measurement unit are associated with a shared substrate.

7. The system of claim 1, wherein the first component is an operational amplifier configured to subtract the mechanical vibration data from the microphone audio data.

8. A method comprising:
receiving, from a microphone associated with a substrate, microphone audio data;
receiving, from a measurement unit, mechanical vibration data, the measurement unit positioned on the substrate within a predetermined distance of the microphone, the predetermined distance based at least in part on a transfer function;
filtering the microphone audio data based at least in part on the mechanical vibration data;
applying natural language processing to the microphone audio data to detect a user command;
determining a pose based at least in part on the mechanical vibration data; and
causing an operation to execute based at least in part on the pose and the command.

9. The method of claim 8, further comprising:
receiving acoustic output data, the acoustic output data being output as sound by a driver; and
filtering the microphone audio data based at least in part on the acoustic output data prior to detecting the command.

10. The method of claim 9, further comprising:
receiving environmental audio data from an external microphone;
generating a noise cancelation signal based at least in part on the environmental audio data and the microphone audio data; and
causing the driver to output the noise cancelation signal.

11. The method of claim 8, wherein the transfer function is determined based at least in part on at least one of:
a material of a device associated with the microphone and the measurement unit;
a distance between the microphone and the accelerometer; or
a relative position on the device between the microphone and the accelerometer.

12. The method of claim 8, wherein a driver outputting the acoustic output data is less than an acoustical transmission threshold from the microphone.

13. The method of claim 8, wherein the microphone and the measurement unit are associated with a shared package.

14. The method of claim 8, wherein filtering the microphone audio data based at least in part on the mechanical vibration data further comprises subtracting the mechanical vibration data from the microphone audio data.

15. The method of claim 8,
wherein the pose is a six degree of freedom pose of a structure including the substrate.

16. One or more non-transitory computer-readable media storing instructions that, when executed by one or more processors, cause the one or more processors to perform operations comprising:
receiving acoustic output data, the acoustic output data being output as sound by a driver;
receiving, from a microphone associated with a substrate, microphone audio data;
receiving, from a measurement unit, mechanical vibration data, the measurement unit positioned on the substrate within a predetermined distance of the microphone, the predetermined distance based at least in part on a predetermined transfer function;
filtering the microphone audio data based at least in part on the mechanical vibration data;
filtering the microphone audio data based at least in part on the acoustic output data;
detecting a command within the microphone audio data; and
causing an operation to execute with respect to the command.

17. The one or more computer-readable media of claim 16, wherein filtering the microphone audio data is based at least in part on a transfer function between the microphone and the measurement unit.

18. The one or more computer-readable media of claim 16, wherein the measurement unit is at least one of:
an inertial measurement unit (IMU);
a contact microphone;
an accelerometer, or
a gyroscope.

19. The one or more computer-readable media of claim 16, wherein the operations further comprise determine a pose of the system based at least in part on the mechanical vibration data and wherein the command is based at least in part on the pose and the microphone audio data.

20. The system of claim 1, further comprising:
a second component to determine a six degree of freedom pose of the system based at least in part on the mechanical vibration data; and
a third component to determine a command based at least in part on the mechanical vibration data and the digital microphone audio data.

* * * * *